United States Patent
Sundaresan et al.

(10) Patent No.: US 9,729,383 B2
(45) Date of Patent: Aug. 8, 2017

(54) FLEXIBLE RULES ENGINE FOR MANAGING CONNECTED CONSUMER DEVICES

(71) Applicant: Ayla Networks, Inc., Sunnyvale, CA (US)

(72) Inventors: Sudha Sundaresan, San Jose, CA (US); Vishwesh Pai, Milpitas, CA (US); Adrian Caceres, Los Gatos, CA (US)

(73) Assignee: Ayla Networks, Inc., Santa Clara, CA (US)

( * ) Notice: Subject to any disclaimer, the term of this patent is extended or adjusted under 35 U.S.C. 154(b) by 13 days.

(21) Appl. No.: 14/515,265

(22) Filed: Oct. 15, 2014

(65) Prior Publication Data
US 2016/0112240 A1    Apr. 21, 2016

(51) Int. Cl.
| | |
|---|---|
| G06F 17/00 | (2006.01) |
| H04L 29/06 | (2006.01) |
| H04L 12/24 | (2006.01) |
| H04L 29/08 | (2006.01) |
| H04W 4/22 | (2009.01) |
| H04W 4/00 | (2009.01) |

(52) U.S. Cl.
CPC .............. *H04L 41/02* (2013.01); *H04L 63/20* (2013.01); *H04L 67/16* (2013.01); *H04L 67/306* (2013.01); *H04W 4/22* (2013.01); *H04W 4/005* (2013.01)

(58) Field of Classification Search
CPC ......... H04L 67/16; H04L 63/20; H04L 41/02; H04L 51/046

USPC ........................................ 726/1, 3, 22; 723/3
See application file for complete search history.

(56) References Cited

U.S. PATENT DOCUMENTS

| 7,484,097 | B2 * | 1/2009 | Steiger ................. H04L 63/126 |
| | | | 709/223 |
| 2004/0034848 | A1 | 2/2004 | Moore et al. |
| 2007/0162567 | A1 | 7/2007 | Ding |
| 2008/0059474 | A1 * | 3/2008 | Lim .................... G06F 17/3089 |
| 2008/0294588 | A1 | 11/2008 | Morris et al. |
| 2009/0052338 | A1 | 2/2009 | Kelley et al. |
| 2010/0097225 | A1 | 4/2010 | Petricoin, Jr. |

(Continued)

OTHER PUBLICATIONS

International Search Report and Written Opinion of the International Searching Authority for PCT Application No. PCT/US2015/047280 mailed Jan. 11, 2016, 12 pages.

*Primary Examiner* — Saleh Najjar
*Assistant Examiner* — Feliciano Mejia
(74) *Attorney, Agent, or Firm* — Lowenstein Sandler LLP

(57) ABSTRACT

A processing device executing a rules engine receives a notification of a first event on a first network-connected device. The processing device identifies a first rule associated with a first user account, wherein the first user account is further associated with the first network-connected device, and wherein the first event on the first network-connected device is an input for the first rule. The processing device determines that the first event satisfies a first criterion of the first rule and generates a first command for a second network-connected device also associated with the first user account. The processing device then transmits the first command to the second network-connected device on behalf of the first user account, wherein the first command causes the second network-connected device to perform an action.

18 Claims, 11 Drawing Sheets

(56) References Cited

U.S. PATENT DOCUMENTS

| | | |
|---|---|---|
| 2013/0006400 A1 | 1/2013 | Caceres et al. |
| 2013/0305314 A1 | 11/2013 | Niimura |
| 2014/0150122 A1* | 5/2014 | Erlingsson .......... G06F 21/6218 726/30 |
| 2014/0266669 A1 | 9/2014 | Fadell et al. |
| 2015/0019553 A1* | 1/2015 | Shaashua ................ H04L 43/10 707/737 |

* cited by examiner

FLEXIBLE RULES ENGINE FOR MANAGING CONNECTED CONSUMER DEVICES

BACKGROUND

Many modern appliances, consumer devices, and other devices include embedded systems that are configured to perform one or more dedicated functions. However, most embedded systems of such devices do not include networking capabilities, role based access control capabilities, remote interface capabilities, remote control capabilities, or related capabilities. Designing such functionality into an embedded system, designing application programming interfaces (APIs) for accessing such functionality, designing web services capable of communicating with and controlling the embedded system via this added functionality, and designing applications for taking advantage of this functionality can consume considerable resources of the device manufacturer. Moreover, traditional embedded systems do not perform actions in response to events on other embedded systems satisfying one or more rules of a rules engine or in response to external events satisfying one or more rules defined by a consumer or original equipment manufacturer (OEM) of the embedded device.

BRIEF DESCRIPTION OF THE DRAWINGS

Reference will now be made to the accompanying drawings showing example embodiments of the present application, and in which.

DETAILED DESCRIPTION

Figure 1:
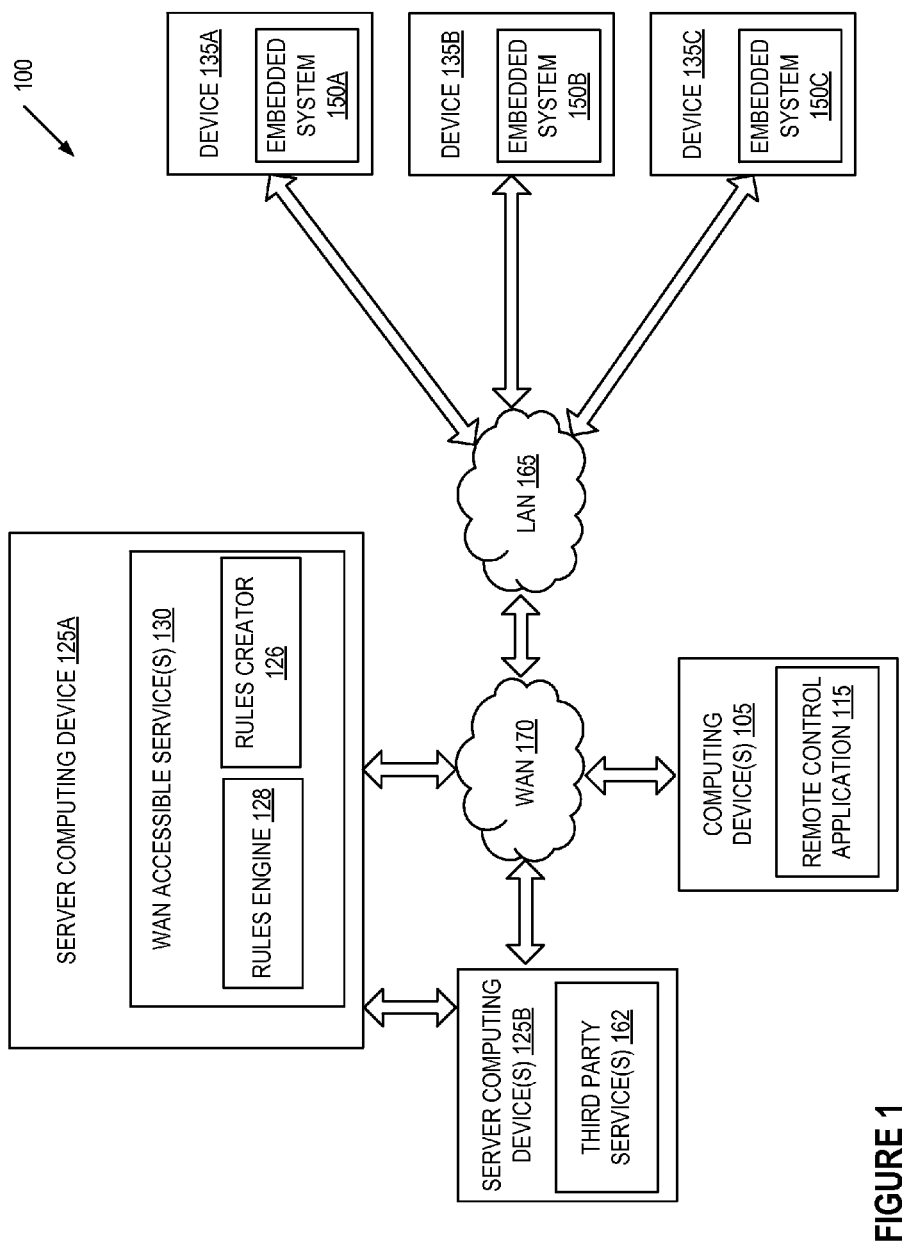
FIG. 1 is a block diagram depicting an example network architecture.

The Internet of Things (IoT) evolution has enabled consumers and original equipment manufacturers (OEMs) to interact with their connected devices in unprecedented ways. The IoT evolution has opened up the possibility of consumers controlling and monitoring their devices remotely, from anywhere in the world. In addition to user initiated actions, users may also desire to program their devices to perform actions in reaction to events. These actions may be used to react to emergency events, to enable efficient operation of devices based on current conditions, to provide notification of critical events to users, and so forth. The methods and techniques described here enable consumers and OEMs to customize what events their devices react to as well as the way their devices react to these events.

Embodiments are directed to a network-connected device platform (also referred to as an internet-of-things (IoT) cloud platform or simply an IoT platform) that provides a flexible rules engine that applies rules to any inputs to generate messages that are sent to outputs. The inputs may be received from one or more network connected devices and/or services, and the outputs may be sent to one or more other network connected devices and/or services. In one embodiment, each input and output to the rules engine is modeled as a feed. A feed can be an input feed, which triggers an action, or an output feed, which may be the action itself. The loosely coupled feeds may be tied together by user defined rules. The IoT platform may at any time generate new rules with a unique set of inputs, criteria and/or outputs. Accordingly, embodiments provide a flexible framework for controlling network-connected devices (e.g., embedded systems) using a rules engine.

In one embodiment, a user account may be associated with a rule, a first network-connected device of a user and a second network connected device of the user. A processing device executing a rules engine receives a notification of an event on the first network-connected device. The processing device identifies the rule, wherein the event on the first network-connected device is an input for the rule. The processing device determines that the event satisfies a criterion of the rule. The processing device then determines an action to be performed by the second network-connected device responsive to determining that the event satisfies the criterion. The processing device generates a command for the second network-connected device, wherein the command causes the second network-connected device to perform the action. The processing device then transmits the command to the second network-connected device. Thus, a user may configure a rule that will cause a second network-connected device to perform an action responsive to an event on a first network-connected device. The event and the action may be detected and performed automatically, whether or not the user is logged into any of the devices or to a service that provides the rules engine.

Referring now to the figures, FIG. 1 is a block diagram depicting an example network architecture 100 including remotely accessible embedded systems and computing devices that interact with the embedded systems. The network architecture 100 includes multiple devices 135A-C connected to a local area network (LAN) 165. Thus, the devices 135A-C may be referred to as network-connected devices.

The devices 135A-C are devices with embedded systems 150A-C, and may include, for example, electrical appliances such as refrigerators, ovens, washers, driers, dishwashers, thermostats, alarms, air conditioners, televisions, radios, receivers, amplifiers, and so forth. The devices 135A-C may also include consumer devices such as digital watches, music players, game consoles, digital cameras, printers, and so forth. Other examples of devices 135A-C include stationary devices such as HVAC systems, traffic lights, factory controllers, signs, electronic billboards, sprinkler systems, and irrigation control systems, as well as medical devices. The embedded systems 150A-C may also be referred to as network-connected devices. Devices 135A-C may also be any other type of device that includes an embedded system.

An embedded system 150A-C is a class of computing device that is embedded into another device as one component of the device. The device 135A-C typically also includes other hardware, electrical and/or mechanical components that may interface with the embedded system 150A-C. Embedded systems 150A-C are typically configured to handle a particular task or set of tasks, for which the embedded systems 150A-C may be optimized. Accordingly, the embedded systems 150A-C may have a minimal cost and size as compared to general computing devices.

The embedded systems 150A-C may each include a communication module (not shown) that enables the embedded system 150A-C (and thus the device 135A-C) to connect to LAN 165 or to a wireless carrier network (e.g., that is implemented using various data processing equipment, communication towers, etc.). The communication module may be configured to manage security, manage sessions, manage access control, manage communications with external devices, and so forth.

In one embodiment, the communication module is configured to communicate using Wi-Fi®. Alternatively, the communication module may be configured to communicate using Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols. If the communication module is configured to communicate with a wireless carrier network, then the communication module may communicate using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology. One example of an embedded system is described in greater detail below with reference to FIG. 8.

Referring back to FIG. 1, the LAN 165 includes a router, switch, bridge or other network device (not shown) that enables communication between multiple devices connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

Some embedded systems 150A-C may not support any of the communication types supported by the network device. For example, device 135A may support Zigbee, and device 135B may support Bluetooth. To enable such devices to connect to the LAN 165, the LAN 165 may include a gateway device (not shown) connected to the network device via one of the connection types supported by the network device (e.g., via Ethernet or Wi-Fi). The gateway device may additionally support other communication protocols such as Zigbee, PLC and/or Bluetooth, and may translate between supported communication protocols. Accordingly, some devices may connect to the LAN 165 through the gateway device.

The LAN 165 (or wireless carrier) is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to one or more server computing devices 125A-B. The server computing devices 125A-B may include physical machines and/or virtual machines hosted by physical machines. The physical machines may be rackmount servers, desktop computers, or other computing devices. In one embodiment, the server computing devices 125A-B include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Server computing device 125A hosts one or more WAN accessible services 130, which may be a web based service and/or a cloud service (e.g., a web based service hosted in a cloud computing platform). A WAN accessible service 130 may maintain a session (e.g., via a continuous or intermittent connection) with one or more of the embedded systems 150A-C. Alternatively, the WAN accessible service 130 may periodically establish sessions with the embedded systems 150A-C. Via a session with an embedded system 150A-C, WAN accessible service 130 may issue commands to the embedded system and/or receive status updates from the embedded system. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Status updates received from the embedded systems 150A-C may identify values or states of some or all detectable parameters of devices 135A-C that the embedded systems are included in. Status updates may also include fault information, statistical device usage information, trace data and/or other information. Such values, states and/or other information may change based on direct user interaction with the devices. Such values, states and/or other information may also change responsive to commands sent to the embedded systems 150A-C by the WAN accessible service 130 and/or by computing devices 105A-C. Moreover, values, states and other information of the embedded systems 150A-C may change based on environmental conditions of the embedded systems. By maintaining or periodically establishing sessions with the embedded systems 150A-C, the WAN accessible services 130 may maintain up-to-date information on the devices 135A-C.

Server computing devices 125B include one or more third party services 162. Third party services 162 may be services provided by entities other than a provider of an IoT platform that includes WAN accessible services 130. As shown, server computing devices 125B may connect to server computing device 125A directly or via WAN 170. Examples of third party services include weather services (e.g., that provide live weather feeds), time services (e.g., an atomic clock), a rich site summary (RSS, also known as really simple syndication) feed, earthquake data for an area (e.g., usable to shut off utilities in the event of a large earthquake), an OEM hosted service that keeps track of customer payments (e.g., usable to turn off device controls if payment is not received), and so on. For actions involving external services, a user may enter their credentials or go through an authorization procedure to provide authorization to perform actions on the user's behalf with regards to the external services.

In one embodiment, WAN accessible services 130 include a rules engine 128 and a rules creator 126. Rules engine 128 applies one or more rules to determine actions and generate messages and/or commands to implement the determined actions based on received events. The rules engine 128 may at any time receive notifications of events from any of devices 135A-C, third party services 162 or other WAN accessible services 130. The rules engine 128 includes multiple input feeds, where each input feed is associated with a source (e.g., third party services 162, embedded systems 150A-C, WAN accessible services 130, etc.). Each of these input feeds may be sources of events that may satisfy conditions specified in rules.

Rules engine 128 identifies a rule or rules for which detected events are inputs. The rules engine 128 then determines whether the events satisfy criteria that trigger one or more actions on other devices 135A-C, WAN accessible services 130 and/or third party services 162. Responsive to determining that a received event satisfies criteria of a rule, rules engine 128 generates a message and sends it to a device 135A-C, WAN accessible service 130 or third party service 162 associated with an output of the rule.

In an example, device 135A is a sprinkler system controlled by embedded system 150A and third party service 162 is a weather feed. Rules engine 128 receives a weather report from the third party service 162 indicating that there is 90% chance of rain. Rules engine 128 includes a rule that causes the rules engine to cancel a scheduled activation of the sprinkler system (device 135A) responsive to a weather report of greater than 50% likelihood of rain. Accordingly, rules engine 128 applies the weather report as an input to the rule, and determines that a scheduled activation of the sprinkler system should be canceled. Rules engine 128 generates a command that will cause the embedded system 150A to cancel the scheduled activation of the sprinkler system, and sends the command to the embedded system 150A.

In another example, device 135A is a washing machine controlled by embedded system 150A and third party service 162 includes an energy cost feed. Rules engine 128 receives a report from the energy cost feed indicating a current cost of energy. Rules engine 128 further receives a report from a smart water meter indicating an amount of water that has been used in a current day. Rules engine 128 includes a rule that causes the rules engine to prevent a wash cycle from initiating when energy costs are above a cost threshold and when more than a threshold amount of water has been used in a day. Accordingly, rules engine 128 applies the energy cost feed and the information from the water meter as inputs to the rule, and determines that a wash cycle cannot be run when the energy cost is above the cost threshold and/or the water usage is above the water usage threshold. Rules engine 128 generates a command that will cause the embedded system 150A to disable the wash cycle for the washing machine, and sends the command to the embedded system 150A.

In another example, device 135A is an Internet enabled door lock to a house and devices 135B-C are Internet enabled lights in the house. Rules engine 128 includes a rule that will cause the lights to turn on responsive to the door lock becoming unlocked. Responsive to a user unlocking the door, embedded system 150A sends a notification to rules engine 128 that a door unlock event has occurred. Rules engine 128 applies the door unlock event to the rule, and determines that the lights are to be turned on. Rules engine 128 then generates commands to turn on the lights, and sends these commands to embedded systems 150B-C. Embedded systems 150B-C then apply the commands and turn on the lights. Thus, an action is automatically performed on one network-connected device (e.g., embedded system 150B) responsive to an event occurring on another network-connected device (e.g., embedded system 150A). There are innumerable other use cases for which rules may be generated and applied by the rules engine 128. The rules engine 128 is discussed in greater detail below with reference to FIG. 2A.

Referring back to FIG. 1, rules creator 126 generates new rules for application by rules engine 128. The rules may be generated by users without performing any programming. In one embodiment, rules creator 216 provides a user interface (e.g., a graphical user interface) that enables users to easily set up new rules for application to their network-connected devices. The rules creator 126 is discussed in greater detail below with reference to FIG. 2B.

Referring back to FIG. 1, computing devices 105 may include portable devices such as electronic book readers, portable digital assistants, mobile phones, laptop computers, portable media players, tablet computers, cameras, video cameras, netbooks, notebooks, and the like. Computing devices 105 may also include traditionally stationary devices such as desktop computers, gaming consoles, digital video disc (DVD) players, media centers, and the like. Computing devices 105 may connect to the WAN 170 and/or to the LAN 165.

Computing devices 105 may include a remote control application (or multiple remote control applications) 115 that can receive information for devices 135A-C and control the devices 135A-C. The remote control application 115 is configured to interface with and/or control one or more of the devices 135A-C via the devices' embedded systems 150A-C. The remote control application 105A-C may be programmed to run on various operating systems, such as Windows® operating systems, Unix® operating systems, iOS® operating systems, Android® operating systems and Java® operating systems to name a few. The remote control application 105 may also be configured as firmware, or as hardware, or as some combination of software, firmware and/or hardware. The remote control application 105 may include a graphical user interface (GUI) that enables users to interact with and control devices 135A-C in an intuitive and user-friendly manner. A user may interact with the GUI to cause the remote control application to generate notifications, commands, property updates and other messages for the devices represented in the GUI.

In one embodiment, the remote control application 115 interfaces with the rules creator 126 to generate new rules and/or to modify existing rules. Rules creator 126 may provide an application programming interface (API) that is used by remote control application 115 to generate and/or modify rules. Alternatively, users may access rules creator 126 to generate and/or modify rules via a web interface that is accessible from a web browser.

Figure 2A:
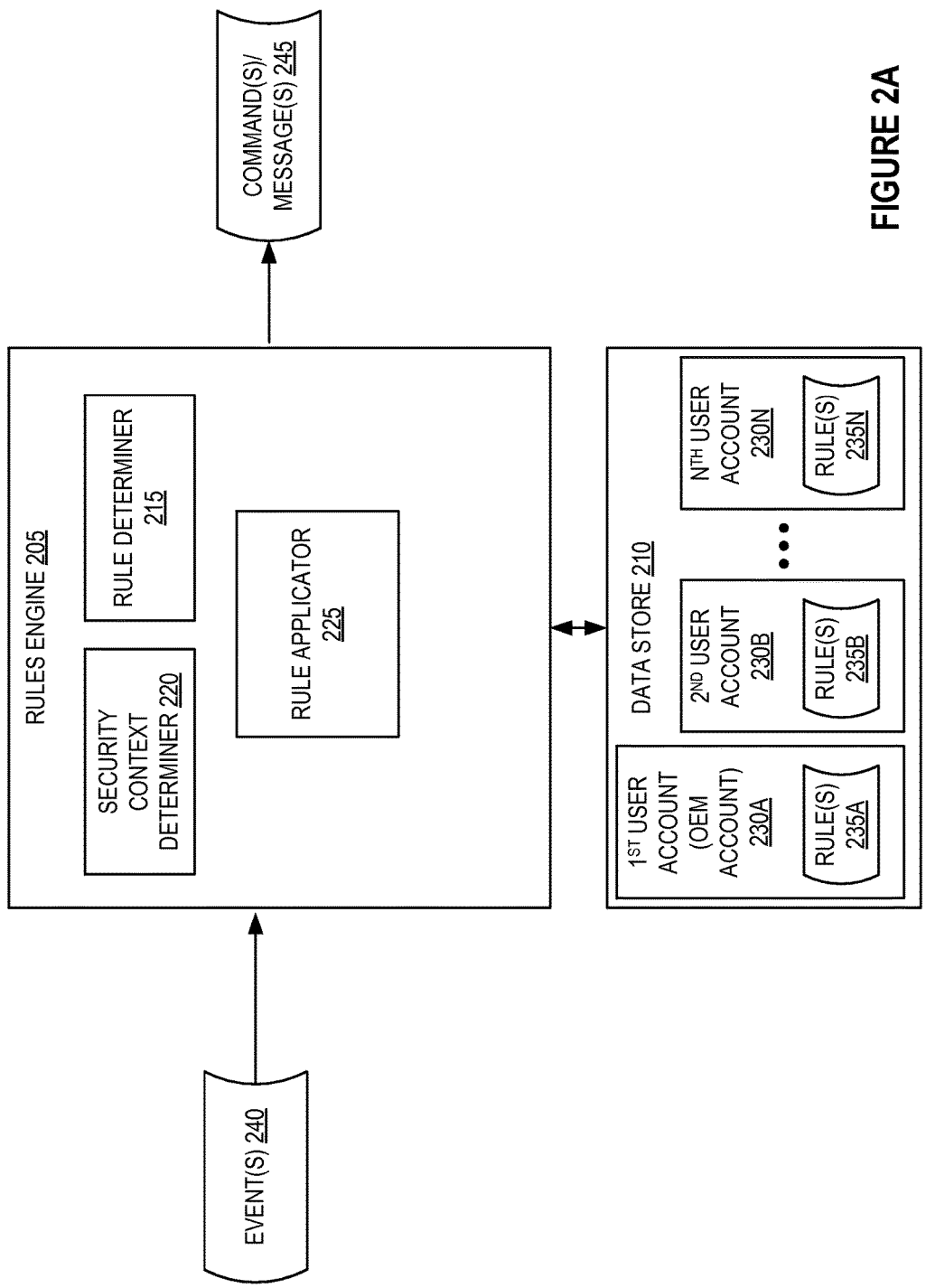
FIG. 2A is a block diagram of an example embodiment of a rules engine.

FIG. 2A is a block diagram of an example embodiment of a rules engine 205, which in one embodiment corresponds to rules engine 128 of FIG. 1. Rules engine 205 exercises an execution path for rules. In the execution path, data from input feeds is evaluated for user-specified conditions inside the rules engine 205, and if true, user-specified actions are taken though corresponding output feeds. Rules engine 205 may include a security context determiner 220, a rule determiner 215 and a rule applicator 225. Alternatively, the functionality of one or more of the security context determiner 220, rule determiner 215 and/or rule applicator 225 may be combined into a single module or divided into multiple sub-modules.

Rules engine 205 is connected to a data store 210 that stores many rules 235A-N. As shown, each of the rules 235A-N may be associated with a particular user account 230A-N of a user that generated the rules. Each user account 230A-N may have a particular security context, and may be associated with one or more devices that are accessible to the user of that user account. Some user accounts may be accounts of OEMs. Such user accounts may have access to all devices manufactured by those OEMs. Other user accounts may be accounts of end users (e.g., owners of devices). Such user accounts may have access to all devices owned by the user as well as other devices for which access has been shared by other user accounts.

Rules engine 205 receives notifications of one or more events 240. These events 240 may be inputs to one or more rules. Rule determiner 215 searches the data store 210 for rules for which the received event or events are inputs. Responsive to finding such a rule, rule determiner 215 invokes rule applicator 225 to apply the identified rule.

Rule applicator 225 applies the event or events 240 to an identified rule 235A-N. Each rule includes one or more criteria that may be met by the events 240. If a criterion or set of criteria of a rule are satisfied, rule applicator 225 determines an action that is triggered. Different events may satisfy different criteria, which may cause different actions to be performed. Rules may have simple criteria that are based on a single event from a single source, or may have complex criteria that are based on multiple events from one or many sources.

Responsive to a rule's criteria being satisfied, security context determiner 220 checks the security context of the rule. Each rule has the same security context of the user account from which that rule was generated. An account manager module (not shown) may perform authentication and authorization operations when a user logs into a user account. Responsive to successful authentication and/or authorization, a token may be generated that ties the user account to a particular security context. This token may be persistent, and may not be deleted when a session of the user to the user account terminates. The token can be provided to devices, services, etc. to show that a rule has access to specific resources (e.g., to network-connected devices). Accordingly, the user does not need to be logged in while the rules engine executes rules on a user's behalf. Actions may be performed by the rules engine and/or devices on the user's behalf as though the user had performed those actions.

Each user account 230A-N has varying levels of access to one or more network-connected devices. The level of access that a user account 230A-N has to particular devices may change over time. For example, an owner of a device may share access to the device for a limited amount of time with another user. While the device access is shared, that other user may generate a rule that will cause a state of the device to change under particular conditions. However, once the sharing of the device by the owner to the other user terminates, that other user no longer has access to change settings of the device. Since the rule generated by the other user is in the security context of the user account for that other user, the rule no longer has a privilege to access the device after the sharing terminates, and would fail. Accordingly, security context determiner 220 determines whether the rule has the appropriate privileges to perform an action indicated by the rule at the time that the rule is applied.

If a rule has the appropriate privileges, the rule applicator 225 generates a command or message that will cause the determined action to be performed. For some actions, the rule applicator 225 generates notification messages and sends them to one or more targets. For example, rule applicator 225 may generate simple message service (SMS) messages, multimedia messaging service (MMS) or other text messages. Rule applicator 225 may also send email messages, or call phone numbers and leave automated messages. Rule applicator 225 may additionally generate commands that will cause particular network-connected devices to perform particular actions. Additionally, rule applicator 225 may generate commands that will cause web services to perform actions. Actions may be performed on a single device or an a group of devices. An action may be the generation of a report, such as a report detailing water usage or energy consumption for the month. Other examples of actions include changing a setting of a device, enabling or disabling a device or function, and so on.

Security context determiner 220 may also create and maintain a security audit log that captures all actions taken on a user account's behalf by the rule processing engine. Each entry in the security audit log may identify the user context associated with an action, as well as whether the action was performed based on direct user interaction or based on application of a rule generated in the user context.

Figure 3:
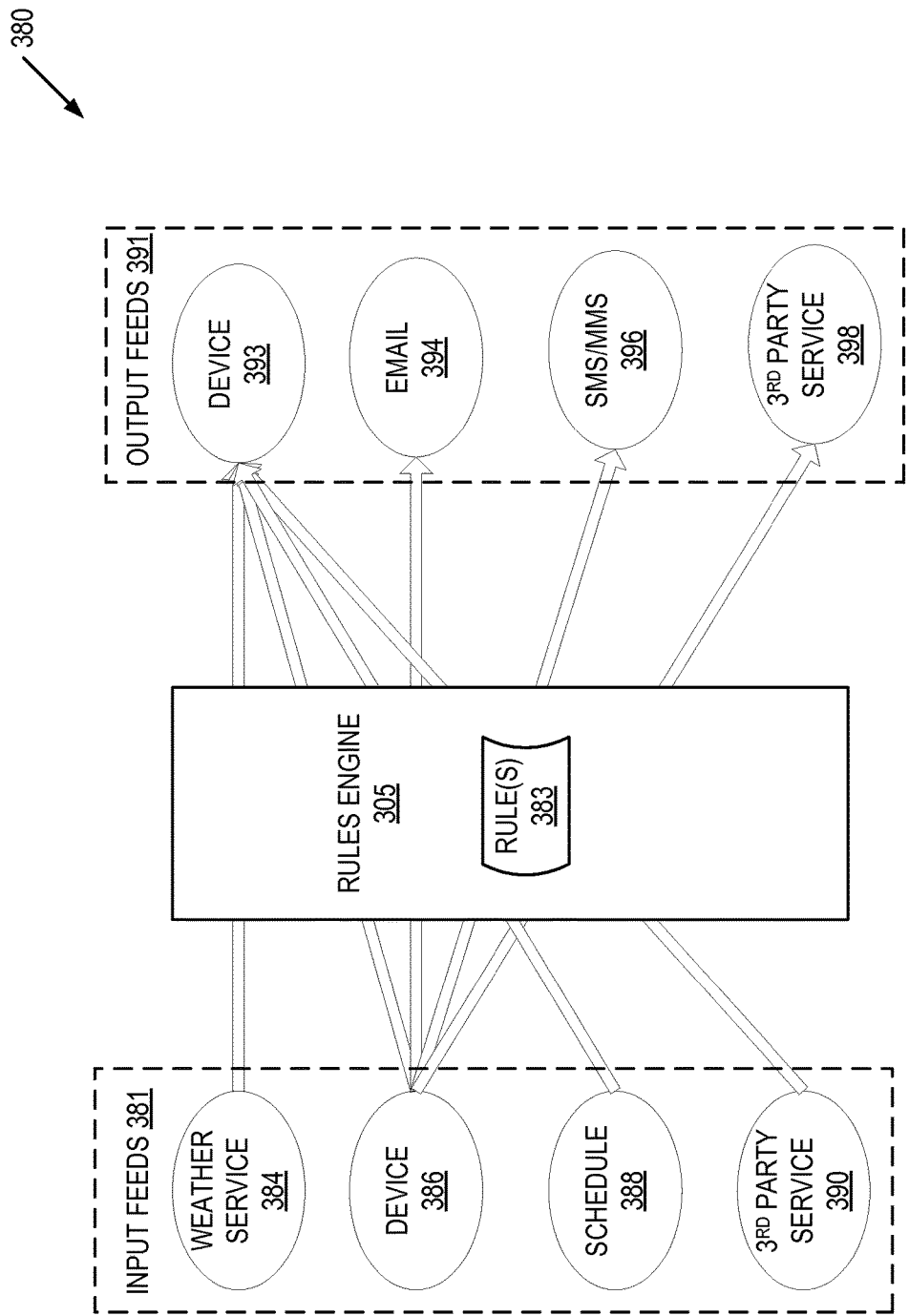
FIG. 3 is a block diagram of input feeds and output feeds of a rules engine applying one or more rules.

FIG. 3 illustrates a rules engine 305 that receives event notifications from multiple input feeds 381, applies the event notifications to one or more rules 383, and sends messages to multiple output feeds 391, in accordance with one example embodiment. As shown, the input feeds 381 may include a weather service 284, one or more devices 386, one or more schedules 388 and/or one or more third party services 390. The schedules 388 may include schedules of devices (e.g., indicating when particular actions are scheduled to occur in the future and/or past) and/or schedules of users (e.g., indicating work schedule, activity patterns such as when users commonly return home, when they go to sleep, when they go to work, when they watch television, etc.), planned travel schedules, and so forth. Output feeds 391 may include one or more devices 393, which may be the same as or different from devices 386. Output feeds 391 further include email 394, text messages 396 (e.g., SMS and/or MMS messages), third party services 398, and so on.

As shown, an event from the weather service 384, event from a device 286, an event from a schedule 388 and an event from a third party service 390 may together satisfy criteria of a rule 383. The rule 383 may cause a command to be generated and issued to device 393. Additionally, an event on device 386 may satisfy another rule 383 that causes an email message 394 to be generated and sent to a user and a text message 396 to be generated and sent to the user. The event may also cause a command to be issued to a third party service 398. For example, if the device is an alarm and the event is a triggering of the alarm, then email and text messages may be sent to addresses of a user to notify him that the alarm has been triggered. Additionally, the third party service 398 may be a security company, and a command to dispatch security personnel to a property associated with the alarm may be sent to the third party service 398.

Figure 2B:
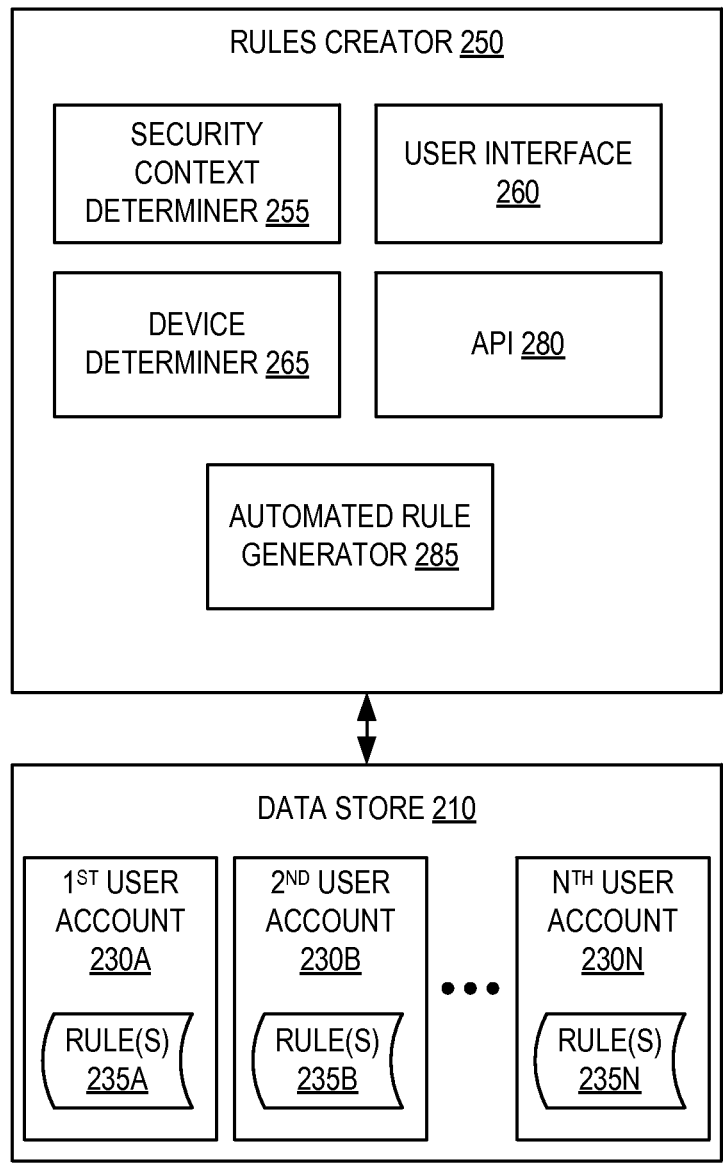
FIG. 2B is a block diagram of an example embodiment of a rules creator.

Referring now to FIG. 2B, a block diagram of a rules creator 250 is shown in accordance with one embodiment of the present invention. Rules creator 250 provides a management path that may be used to create, read, update and delete input feeds, output feeds and rules. In the management path, rules are manufactured and then persisted in the rules engine. Rules creator 250 may include a security context determiner 255, a user interface 260, a device determiner 265, and an application programming interface (API) 280. Alternatively, the functionality of one or more of the security context determiner 255, user interface 260, device determiner 265, and/or API 280 may be combined into a single module or divided into multiple sub-modules.

User interface 260 may be a graphical user interface that may provide drop down windows, menus, display bars, icons, and other graphical representations of rules, events, inputs, output, actions, and so on. Alternatively, user interface 260 may be a command line user interface. User interface 260 may present multiple options for rule creation and rule modification responsive to a user request to generate a new rule.

When a rule creation request is received, security context determiner 255 determines a security context of a user account from which the request was received. This security context will be associated with the rule for the life of the rule.

Device determiner 265 identifies the devices to which the user account has access and the level of access to these devices based on the security context. User interface 260 may display these available devices.

User interface 260 may provide options for selecting inputs for a rule. User interface 260 may provide a drop down menu or other listing of available devices that may be used as inputs to the rule. User interface 260 may also identify services (e.g., WAN accessible services, third party services, schedules, etc.) that may be used as inputs for the rule. Some devices and/or services may have multiple parameters, settings, features, etc. that may be used as inputs. If such a device or service is selected, then the available parameters, settings, features, etc. of the selected device or service are displayed (e.g., in a drop down menu). A user may then select the specific event or events from the selected device or service that will be an input to the rule. The user may select any number of events that will be inputs to the rule. These events may be from a single device or service or from multiple devices and/or services.

Once one or more input events are selected, a user may select criteria to be satisfied by the events. A separate criterion may be selected for each input event. The criteria that are available for an event may be based on the event that was selected. The rules creator 250 may include a database or other data structure that identifies the possible states, thresholds, or other criteria that may be applied to each input event. Accordingly, user interface 260 may present to the user a listing of criterion options for selected input events.

User interface 260 may additionally provide a listing (e.g., a drop down list) of devices and services that may be outputs for the rule. A different listing of output devices than input devices may be shown. This may be due to the security context having read privileges but not write privileges to some devices. For example, if a security context has a read privilege to a device, then that device may be used as an input feed for input events to a rule. However, if the security context does not have a write privilege to the device, then that device may not be used as an output feed in some instances.

After a user selects one or more devices and/or services for output, the user may select actions to perform on these outputs. Actions may include sending a notification or sending a command to perform an action. Actions may be one-time actions that are triggered shortly after the criteria of a rule are satisfied. Actions may also be scheduling actions that schedule a delayed action to be performed at a future date and/or time once or at future dates and/or times repeatedly. For example, a scheduling action may cause a schedule to be created that will in turn cause a particular action to be performed every day at 1 PM. The list of available actions that may be performed for a selected output device or service may be presented to the user responsive to the user selecting that device or service as an output feed for the rule.

Application programming interface (API) 280 may interface with a client application (e.g., a remote control application running on a client device) to create and/or modify a rule. The client application may provide the same or a similar user interface as user interface 260. The user interface of the client application may communicate with the API 280 to generate and modify rules using the same techniques described herein with reference to the user interface 260.

In one embodiment, rules creator 250 includes a rules tester 282 that may test one or more rules that have been created by a user. Rules tester 282 may simulate different circumstances and simulate execution of the rules responsive to the simulated circumstances. Rules tester 282 may additionally test the interaction of multiple different rules. Such testing of multiple rules may expose potential problems such as rule execution loops. As a result of such testing, rule execution loops may be detected and prevented. A rule execution loop is a condition in which a first rule triggers an action, which causes a second rule to trigger an action, which causes the first rule to trigger an action, and so on. Testing of multiple rules may also expose unexpected or unwanted interactions between multiple rules.

Once a rule has been generated, rules creator 250 stores the rule in data store 210. The rule is stored in a security context of a particular user account that requested creation of the rule. For example, a first user account 230A includes a first security context and a first set of rules 235A, a second user account 230B includes a second security context and a second set of rules 235B, and an nth user account 230N includes an nth security context and an nth set of rules 235N.

In one embodiment, rules creator 250 includes an automated rule generator 285. Automated rule generator 285 may apply a machine learning algorithm (e.g., Kohonen maps, support vector machines (SVM), k-nearest neighbor classifiers, etc.) to logs of events and actions across devices and services. Automated rule generator may learn patterns of events and corresponding actions on disparate devices. Automated rule generator 285 may then create a rule based on the observed behavior. For example, automated rule generator 285 may detect a pattern in which a user turns on a television set and radio shortly after opening a front door after coming home from work in the evenings of workdays. Accordingly, automated rule generator may create a rule without user input that will turn on the television and radio if it is a weekday, and after 5 PM, and a door open event is detected. An automatically created rule may be created for a specific user account, and may have the security context of that user account.

Rules creator 250 and rules engine 205 may manage user accounts using a multi-tenancy model. Accordingly, each user account (e.g., each OEM or each device owner) may have access only to those devices for which they have access privileges, and each user account may have access only to those rules that they created. Accordingly, the rules associated with each user account may be isolated from those of other user accounts. To each user account 230A-N, it may appear that the rules creator 250 and rules engine 205 service only that user account.

FIGS. 4-7B are flow diagrams showing various methods of creating and applying rules for controlling, and/or responding to events on, network-connected devices, in accordance with embodiments of the present invention. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a server computing device (e.g., server computing device 125 of FIG. 1).

Figure 4:
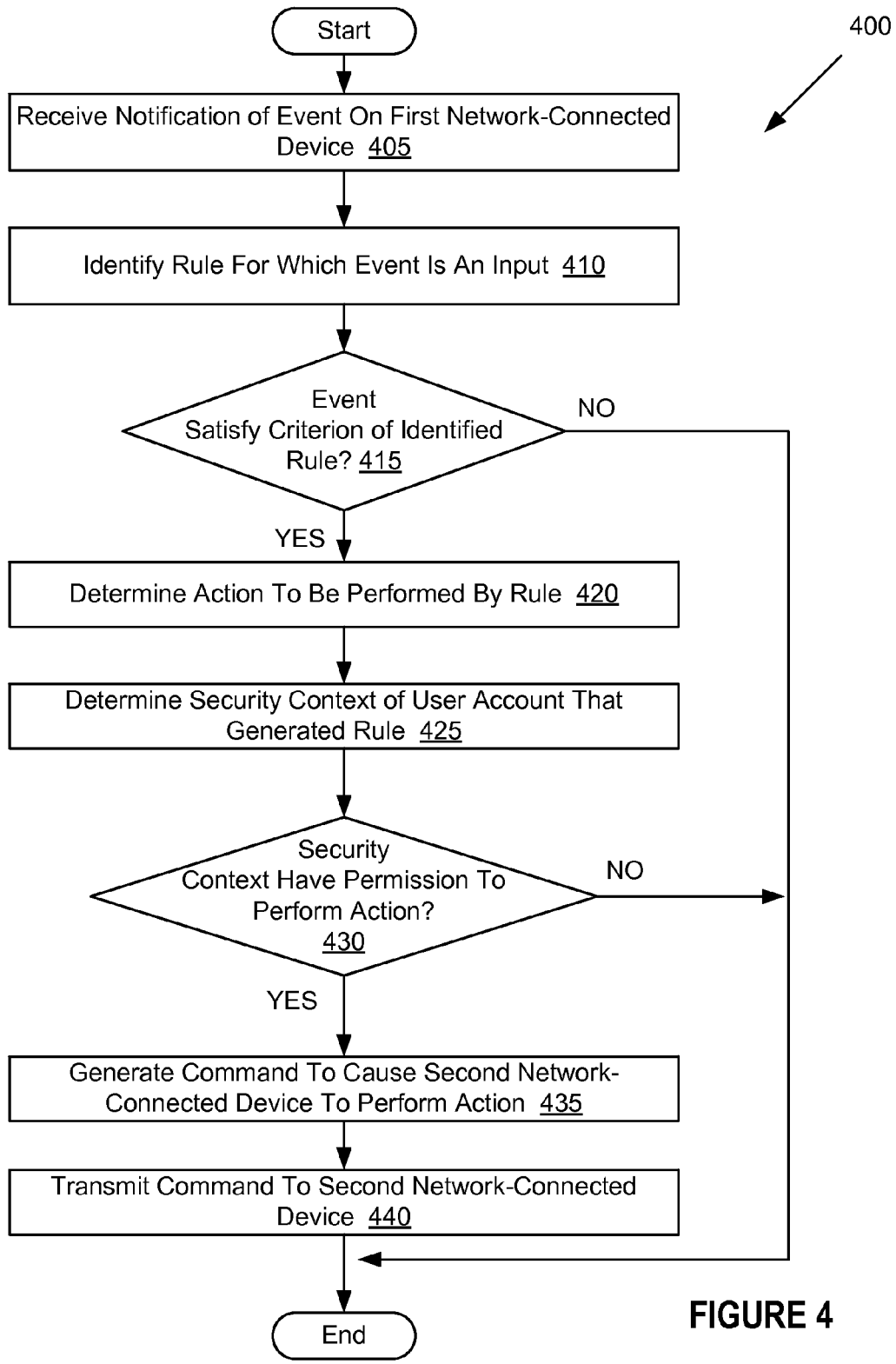
FIG. 4 is a flow chart for an example method of triggering an action on a second network-connected device responsive to an event on a first network-connected device.

FIG. 4 is a flow chart for an example method 400 of triggering an action on a second network-connected device responsive to an event on a first network-connected device. At block 405 of method 400, processing logic receives notification of an event that has occurred on a first network-connected device. The event may be a change in a setting (e.g., a user having changed a temperature set point of a thermostat, a light having been turned on, an alarm having been set on an alarm clock, a watering schedule having been set on a sprinkler control system, and so on), a change in a measured parameter (e.g., a current temperature as measured by a thermostat, detection of motion by a motion sensor, detection of light by a light sensor, and so on), or other event associated with a network-connected device.

At block 410, processing logic identifies a rule for which the event is an input. The rule may be set up such that the first network-connected device is an input feed for the rule. When events are reported by the first network-connected device, processing logic compares those events to a criterion (or multiple criteria) of the rule. At block 415, processing logic determines whether the event on the first network-connected device satisfies a criterion of the rule. If the criterion is satisfied by the event, the method continues to block 420. Otherwise the method ends.

At block 420, processing logic determines an action to be performed by the rule. The action may be an action that is to be performed by a second network-connected device. Any type of action may be performed, such as turning on or off the second network-connected device, changing a setting of the second network-connected device, and so on. Additionally, the action may be an immediate action or may be a scheduled future action.

At block 425, processing logic determines a security context of the rule. A security context of the rule may be the same as the security context of the user that generated the rule. Accordingly, processing logic may determine the security context of the user account that generated the rule. The security context may be determined by identifying a token associated with the rule and querying an access controller module to determine what permissions are available to the rule.

At block 430, processing logic determines whether the security context has permission to perform the determined action on the second network-connected device. For example, processing logic may determine whether the security context of the user account has write privileges to the second network-connected device. If the security context has permission to perform the action, the method continues to block 435. Otherwise, the method ends.

At block 435, processing logic generates a command to cause the second network-connected device to perform the determined action. At block 440, processing logic transmits the command to the second network connected device. The second network-connected device may then execute the command to perform the action. The second network-connected device may perform the action even though a user may not have an active session to the user account that generated the rule.

Figure 5:
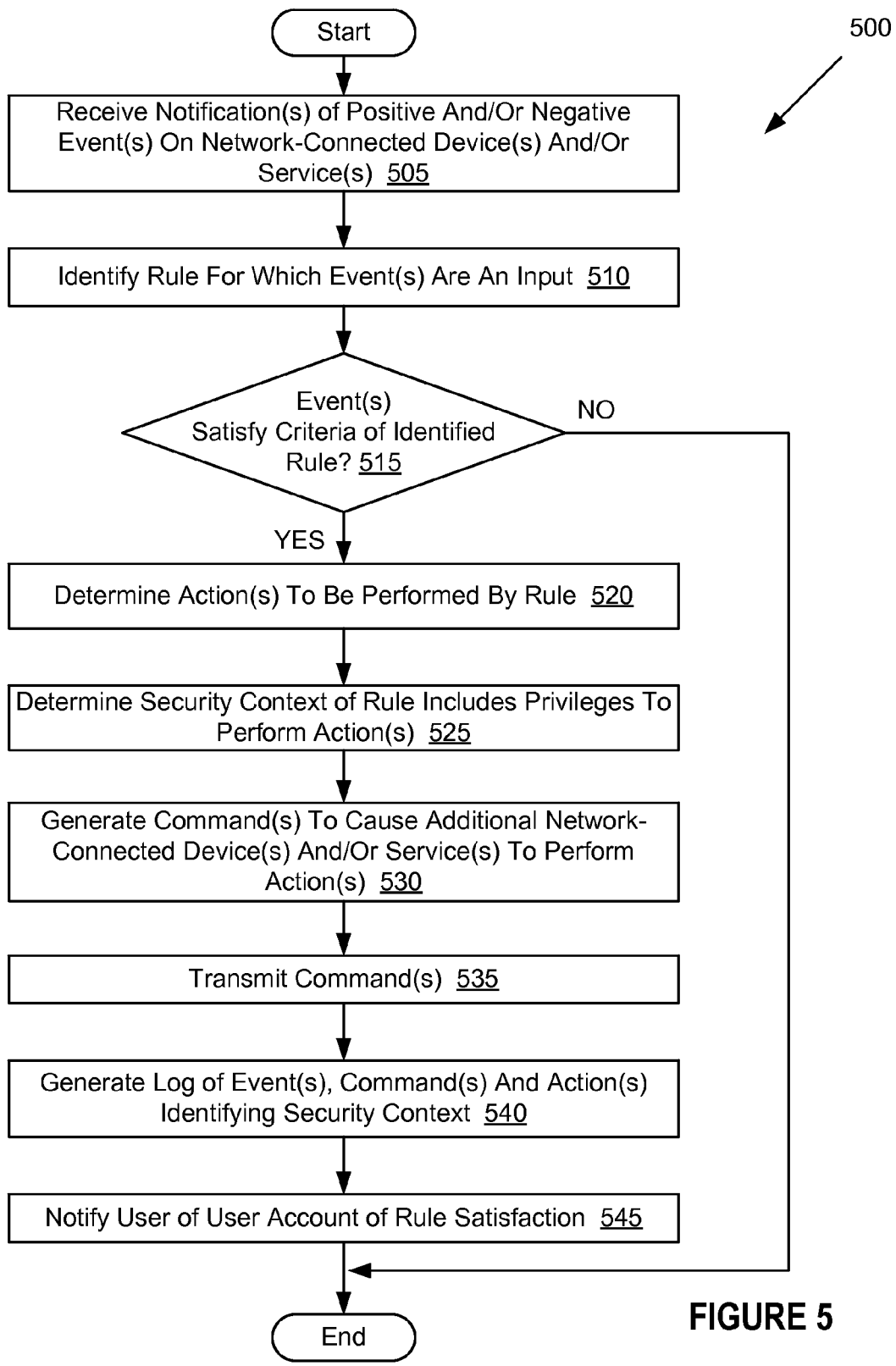
FIG. 5 is a flow chart for an example method of triggering one or more actions on services and/or network-connected devices responsive to events on other services and/or network-connected devices.

FIG. 5 is a flow chart for an example method 500 of triggering one or more actions on services and/or network-connected devices responsive to events on other services and/or network-connected devices. At block 505 of method 500, processing logic receives notification of positive and/or negative events that have occurred on a network-connected device and/or on a service. The service may be a third party service or a service of an entity that controls the processing logic (e.g., a WAN accessible service of an IoT platform). A positive event is an event that has occurred, such as a trip of a switch, a variable reaching a set point, and so forth. A negative event is a lack of occurrence of an event. For example, a notification of a negative event may be a notification that a thermostat failed to reach a set point within a time period, or that a sprinkler system did not turn on in a time period.

At block 510, processing logic identifies a rule for which the one or more events are an input. At block 515, processing logic determines whether the events satisfy criteria of the identified rule. If the event (or events) satisfy the criteria, the method continues to block 520. Otherwise the method ends.

At block 520, processing logic determines one or more actions to be performed by the rule. At block 525, processing logic determines a security context of the rule and determines that the security context includes privileges to perform the one or more determined actions. At block 530, processing logic generates commands to cause an additional network-connected device and/or a service to perform an action. At block 535, processing logic transmits the commands to the additional network-connected devices and/or to the services. These devices and/or services may then execute the commands to perform the determined actions.

At block 540, processing logic generates a log of events, commands and actions that have been performed. The log may also indicate a rule that was triggered to cause the actions to be performed. The log may identify a security context of the commands and actions that were triggered by the rule. The security context may be the security context of the user that generated the rule that was triggered.

At block 545, processing logic notifies a user of the user account of the rule satisfaction. The notification to the user may be an electronic mail (email) message sent to an email address of the user. The notification to the user may also be an SMS or MMS message sent to a phone number of the user. The notification may also be an automated phone call to a phone number of the user, a posting to a social network account of the user, or other type of notification.

Figure 6:
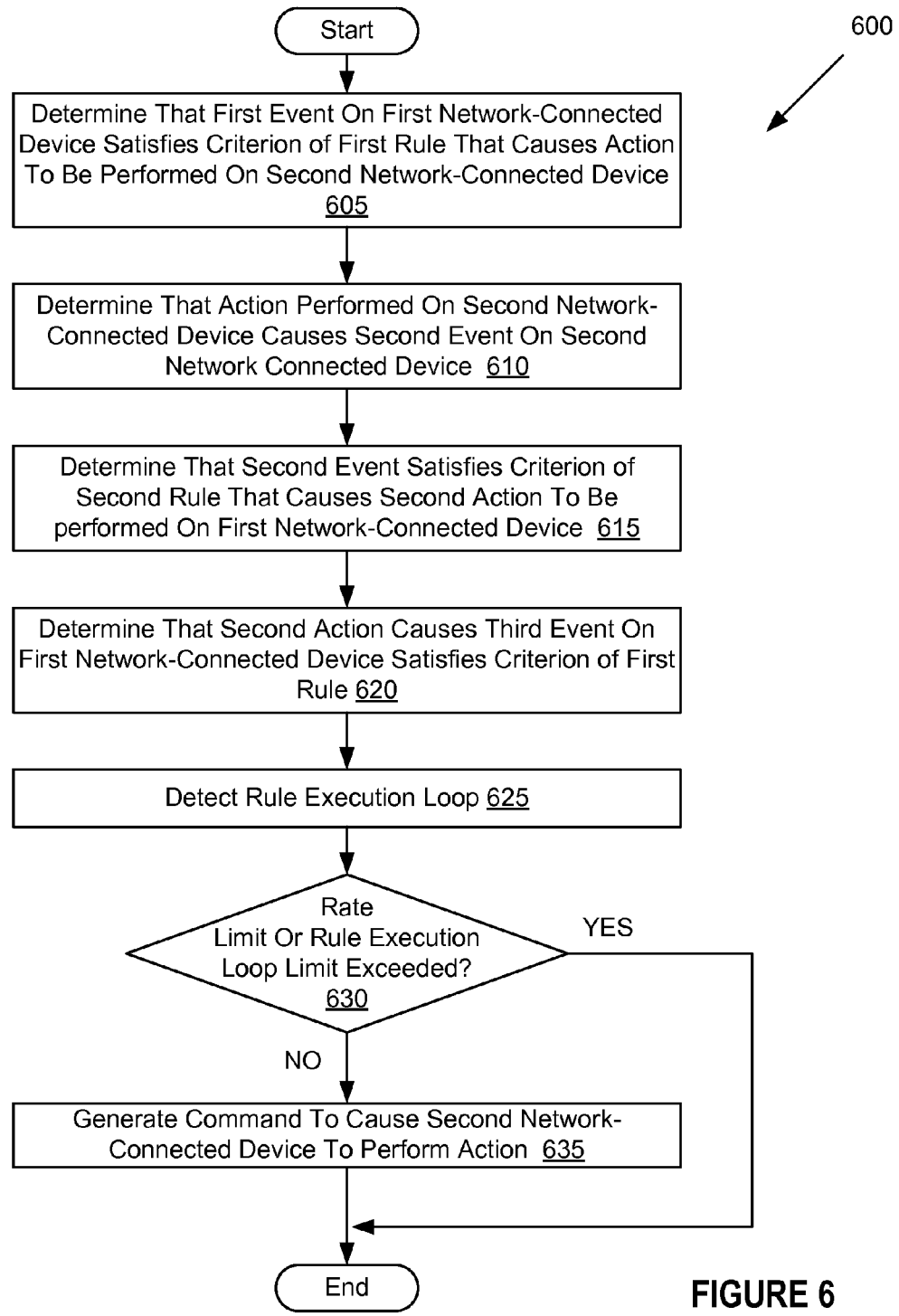
FIG. 6 is a flow chart for an example method of performing rate limiting and/or loop detection for rules.

FIG. 6 is a flow chart for an example method 600 of performing rate limiting and/or loop detection for rules. Method 600 may be performed when a rule is generated to test interactions between the new rule and existing rules, and to proactively apply rules that will control how the rule behaves under rule execution loop conditions. Method 600 may also be performed during execution of a rule (e.g., after the rule has been deployed). At block 605 of method 600, processing logic determines that a first event on a first network-connected device satisfies a criterion of a rule that causes an action to be performed on a second network-connected device. At block 610, processing logic determines that the action performed on the second network-connected device causes a second event on the second network connected device. At block 615, processing logic determines that the second event satisfies a criterion of a second rule that causes a second action to be performed on the first network-connected device. At block 620, processing logic determines that the second action causes a third event on the first network-connected device that satisfies a criterion of the first rule.

At block 625, processing logic detects a rule execution loop. A rule execution loop is a loop in which two or more rules repeatedly trigger each other. For example, the first rule triggering the second rule, which again triggers the first rule as described at blocks 605-620.

At block 630, processing logic determines whether a rate limit or a rule execution loop limit is set. A rate limit is a permissible number of times that a rule may be triggered in a given time period. For example, a rule may be allowed to trigger 1 time per minute, 2 times per hour, 10 times per day, and so forth. A rule execution loop limit is a number of iterations of a rule execution loop that are permitted. A rule execution loop limit of 0 would mean that no rule execution loops are allowed. A rule execution loop limit of 2 would mean that a rule execution loop may be iterated twice. Processing logic further determines whether the rate limit or rule execution loop limit has been exceeded. If so, the method ends without generating any further commands even though the criterion of the first rule has been satisfied. If the rate limit and/or rule execution loop limit have not been exceeded, the method continues to block 635.

At block 635, processing logic generates a command to cause the second network-connected device to perform the determined action. Note that method 600 illustrates a simple loop that includes only two rules. However, more complicated loops may include 3, 5, 10 or even more rules that under certain conditions repeatedly trigger each other.

Figure 7A:
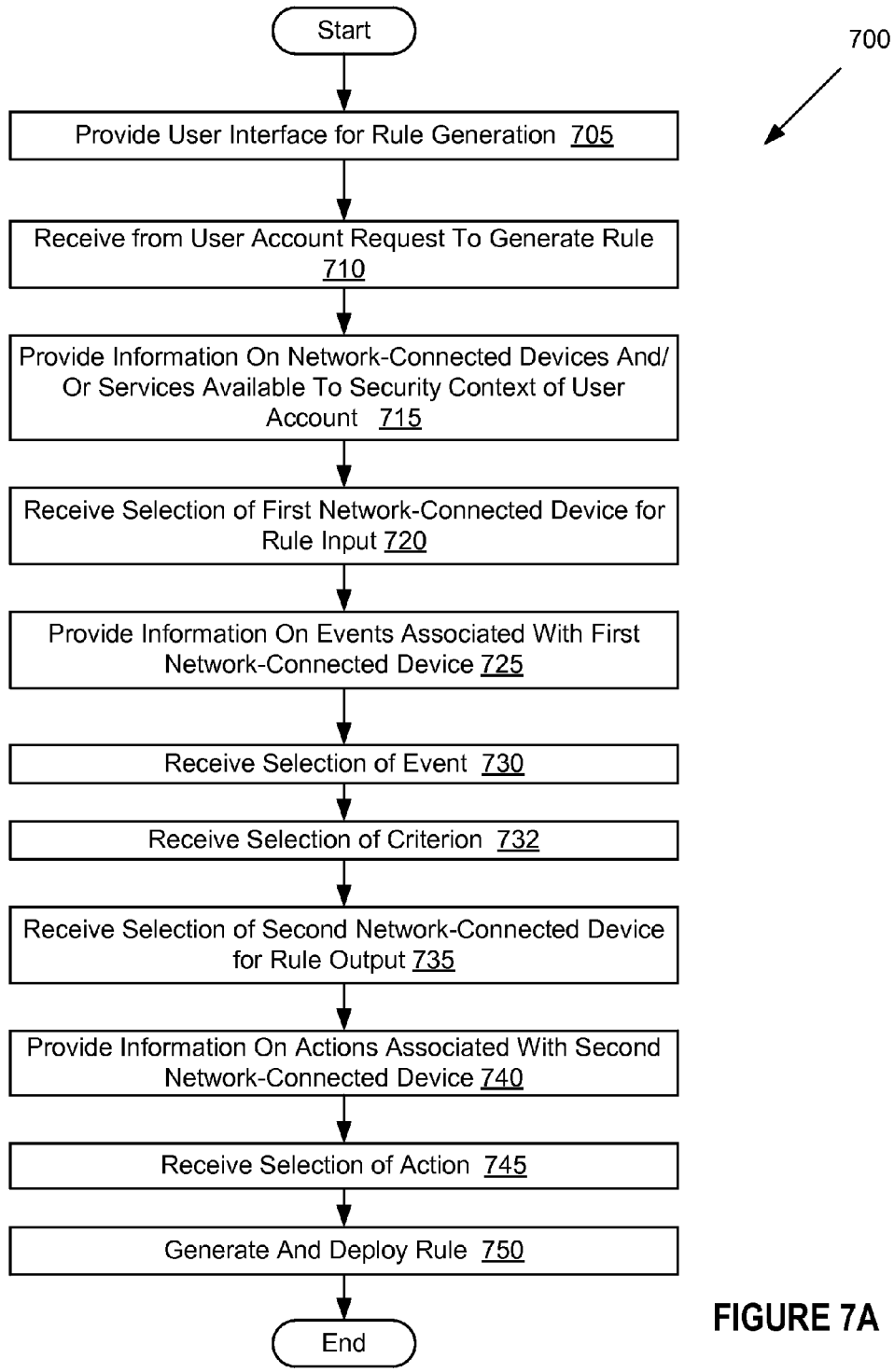
FIG. 7A is a flow chart for an example method of generating a rule for execution by a rules engine.

FIG. 7A is a flow chart for an example method 700 of generating a rule for execution by a rules engine. At block 705 of method 700, processing logic provides a user interface for rule generation. The user interface may be a graphical user interface that includes drop down menus, windows, buttons, icons, and so forth. At block 710, processing logic receives from a user account a request to generate a rule. Alternatively, processing logic may receive a request to modify an existing rule.

At block 715, processing logic provides information on network-connected devices and/or services that are available to the security context of the user account. At block 720, processing logic receives selection of a first network-connected device to be used as a rule input.

At block 725, processing logic provides information on events associated with the first network-connected device. At block 730, processing logic receives selection of an available event that will be used as a rule input. At block 732, processing logic receives selection of a criterion that is to be satisfied by the event to cause the rule to perform an action.

At block 735, processing logic receives selection of a second network-connected device as a rule output. At block 740, processing logic provides information on actions associated with the second network-connected device (e.g., actions that can be performed by the second network-connected device). At block 745, processing logic receives selection of an action. At block 750, processing logic generates and deploys the rule.

Note that all of the information provided at the various blocks of method 700 may be provided by the user interface for rule generation. Additionally, all of the selections of events, devices, actions, and so forth may also be received via the user interface. Accordingly, the user interface provides a user friendly system for generating complex rules without resorting to a user performing any programming. Moreover, rule generation is tailored to a specific security context of a user generating the rule. The selection of devices, services, events and actions may be unique to a particular security context. Accordingly, the options for rules generation may vary from user to user.

It should also be noted that method 700 details an example for creating a simple rule that includes only one input and one output, both of which are network-connected devices. However, the input or the output may alternatively be a service or data feed. Additionally, multiple inputs and/or multiple outputs may be included in more complex rules. Such rules may include multiple criteria that are to be satisfied before commands are generated, notifications are sent, or other actions are performed.

Figure 7B:
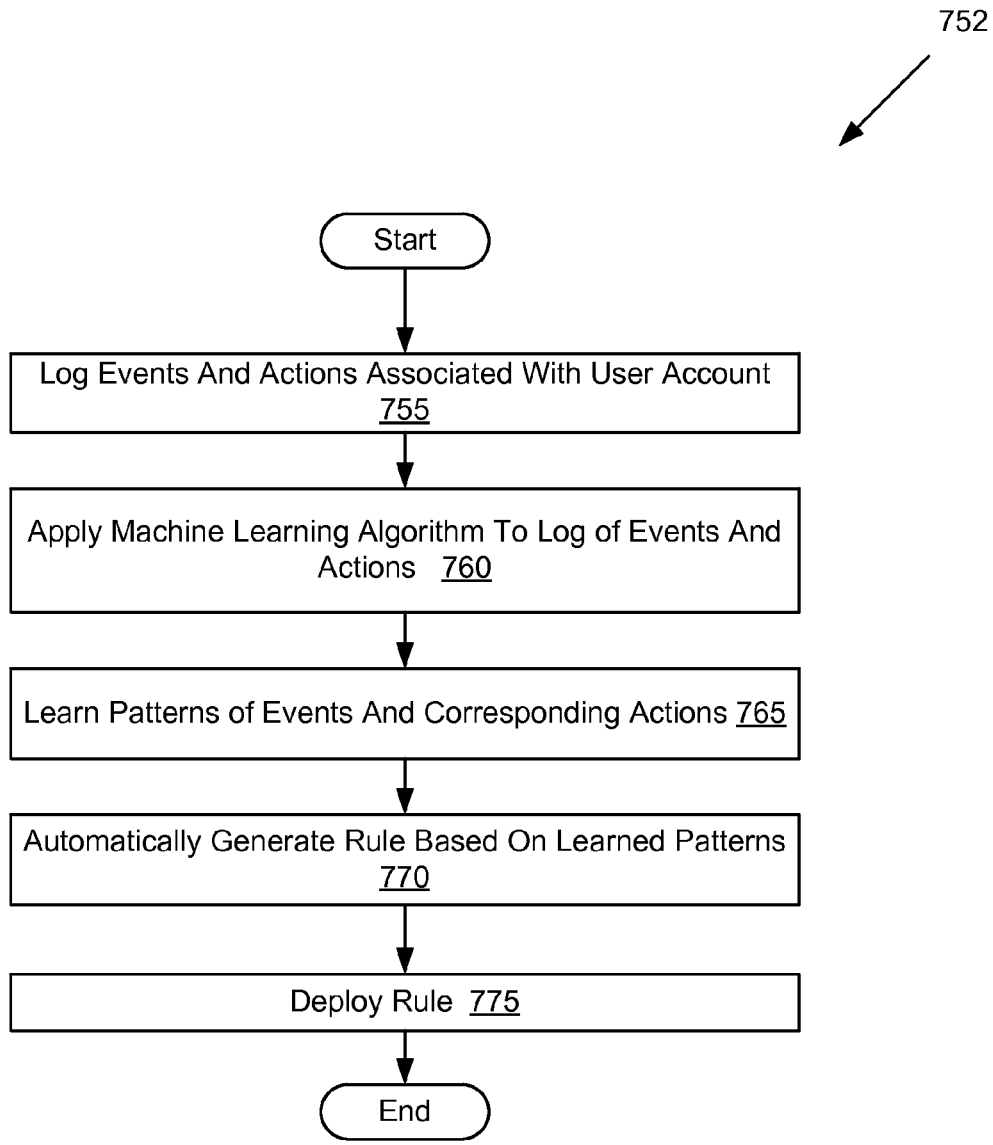
FIG. 7B is a flow chart for another example method 752 of generating a rule for execution by a rules engine.

FIG. 7B is a flow chart for another example method 752 of generating a rule for execution by a rules engine. At block 755 of method 700, processing logic logs events and actions associated with a user account (e.g., events and actions that occur in the context of a particular user account). Alternatively, processing logic may receive a log of events and actions that was generate by another entity.

At block 760, processing logic apples a machine learning algorithm to the log of events and actions. At block 765, processing logic then learns patterns of events and corresponding actions based on the application of the log into the machine learning algorithm. At block 770, processing logic automatically generates a rule based on the learned patterns. The rule may cause a particular action to be performed responsive to detection of a particular event or type of event, for example. At block 775, processing logic deploys the rule. The method then ends.

Figure 8:
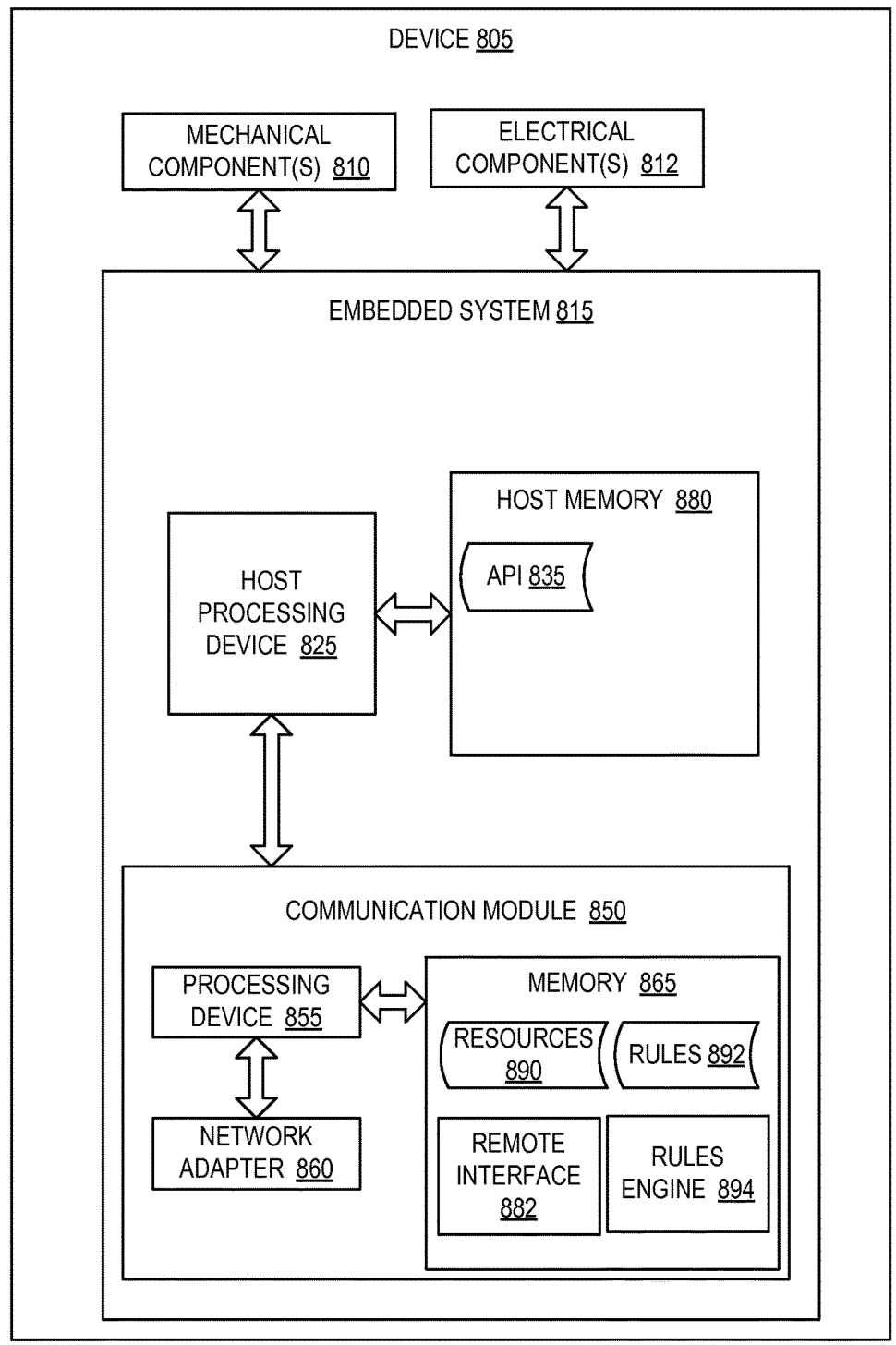
FIG. 8 is a block diagram of an example device having a remotely accessible embedded system.

FIG. 8 is a block diagram of an example device 805 having a remotely accessible embedded system 815. The device may include any of the aforementioned types of devices having an embedded system, and in one embodiment corresponds to a device 135A-C of FIG. 1. In one embodiment, the device 805 includes mechanical components 810, electrical components 812 and an embedded system 815. The electrical components 812 and/or mechanical components 810 may include sensors, programmable logic controllers (PLCs), switches, motors, valves, actuators, and so forth.

The embedded system 815 may include a host processing device 825, a host memory 830 and/or a communication module 850 coupled to the host processing device 825. The embedded system 815 may also include numerous other components that are not shown herein. Examples of such additional components may include light emitting diodes (LEDs), a power supply regulator, fuses, ports, a user interface, digital to analog (D/A) converters, analog to digital (A/D) converters, field programmable gate arrays (FPGAs), application specific integrated circuits (ASICs), and so on.

Host processing device 825 may be a microcontroller or a digital signal processor (DSP) in one embodiment. Host processing device 825 may alternatively or additionally include a programmable logic controller (PLC), a field programmable gate array (FPGA) or a complex programmable logic device (CPLD). The host processing device 825 may be configured to perform specific functions related to the operation and control of the device 805.

Host memory 830 may include random access memory (RAM), read only memory (ROM), one time programmable (OTP) ROM, Flash (e.g., NOR Flash), or other types of memory. Host memory 830 may store an application programming interface (API) 835 for the communication module 850. The API 835 may enable the host processing device 825 to send commands and/or data to and receive commands and/or data from communication module 850. Host memory 830 may also include firmware for the host processing device 825 that configures the host processing device to perform one or more operations that are specific to device 805.

In some embodiments, the host memory 830 may be integrated into the host processing device 825. For example, microcontrollers typically include a processor core, memory and programmable input/output peripherals. Accordingly, if the host processing device 825 is a microcontroller, then host memory 830 may be a memory of host processing device 825.

Communication module 850 may be an integrated circuit (IC) that is configured to be coupled to host processing device 825 of embedded system 815. Communication module 850 may be provided by a third party to a manufacturer of the device along with the API 835, and may enable network capability and remote control capability to be easily added to the device 805. The communication module 850 may include its own processing device 855, a memory 865 and/or a network adapter 860. The processing device 855 may be a microcontroller, a DSP, a PLC, a microprocessor or programmable logic device such as an FPGA or a CPLD. The memory may include a non-volatile memory (e.g., RAM) and/or a volatile memory (e.g., ROM, Flash, etc.). In one embodiment, memory 865 is integrated into processing device 855.

Memory 865 may store data identifying one or more resources 890 (e.g., parameters, attributes and data) of the device 805 that may be accessible to various security contexts. Any of these resources may be used as events or actions for generated rules. Memory 865 may also store firmware for the processing device 855, such as firmware that includes instructions for a remote interface 882.

Network adapter 855 may be a wired network adapter (e.g., an Ethernet adapter) or a wireless network adapter (e.g., a Wi-Fi adapter or other wireless local area network (WLAN) adapter). Network adapter 860 may also be configured to provide connection to a network or other devices using Zigbee, PLC, Bluetooth, 6LowPAN, or other communication protocols. Network adapter 860 may receive notifications and other messages from a WAN accessible service and/or remote control applications. Network adapter 860 may additional send outgoing messages to the WAN accessible service and/or to remote control applications.

Embodiments have been described hereinabove with reference to a rules engine that is provided as a WAN accessible service (e.g., as a web service or cloud service). However, in some embodiments a rules engine 894 may be included in the memory 865 of communication module 850. The rules engine 894 may apply one or more rules 892 also resident in the memory 865. Rules engine 894 may perform any of the operations previously described with reference to a WAN accessible service rules engine. However, rather than input feeds being from external sources and output feeds being to other external destinations, either the input feeds or output feeds of rules engine 894 are associated with embedded system 815. Accordingly, rules engine 894 may apply rules 892 that trigger actions on the embedded system 815 responsive to input from an external source. Rules engine 894 may also apply rules that generate commands to external destinations responsive to events occurring on the embedded system 815.

Figure 9:
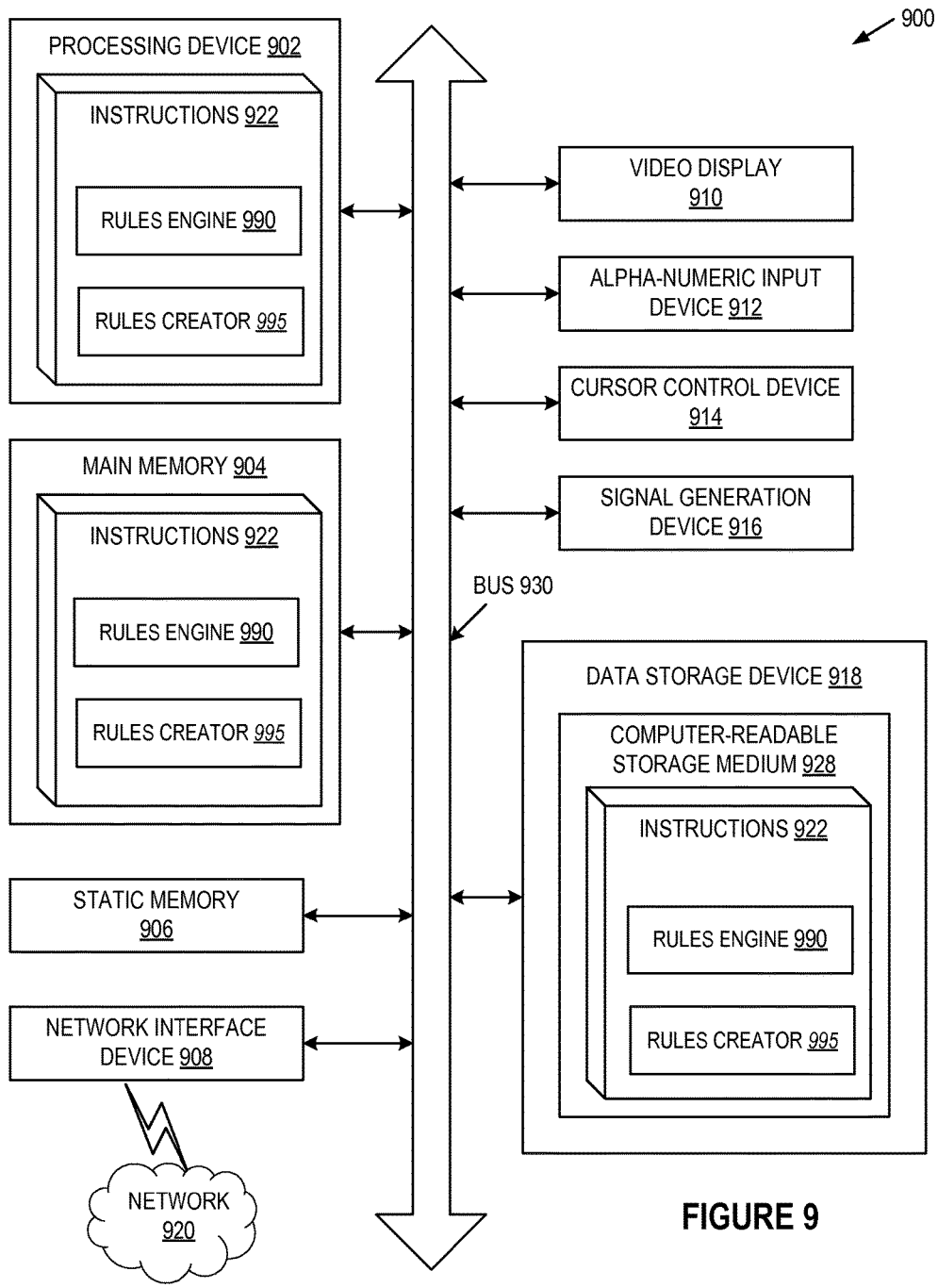
FIG. 9 illustrates a block diagram of one embodiment of a computing device.

FIG. 9 illustrates a diagrammatic representation of a machine in the example form of a computing device 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory (e.g., a data storage device 918), which communicate with each other via a bus 930.

Processing device 902 represents one or more general-purpose processors such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the processing logic (instructions 922) for performing the operations and steps discussed herein.

The computing device 900 may further include a network interface device 908. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-readable storage medium (or more specifically a computer-readable storage medium) 928 on which is stored one or more sets of instructions 922 embodying any one or more of the methodologies or functions described herein. The instructions 922 may also reside, completely or at least partially, within the main memory 904 and/or within the processing device 902 during execution thereof by the computer system 900, the main memory 904 and the processing device 902 also constituting computer-readable storage media.

The computer-readable storage medium 928 may also be used to store a rules engine 990 and/or a rules creator 995 (as described with reference to FIGS. 2A-2B), and/or a software library containing methods that call a rules engine 990 and/or rules creator 995. While the computer-readable storage medium 928 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-2B) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "identifying", "determining", "generating", "transmitting", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:

generating, at a first time, a first rule associated with a first user account having a first security context, wherein the first rule also has the first security context, wherein the first rule comprises instructions to generate a first command to cause a first network-connected device to perform a first action responsive to satisfaction of a first criterion, and wherein the first command is permissible to the first security context at the first time;

receiving, by a processing device executing a rules engine, a notification of a first event on at least one of the first network-connected device, a second network-connected device or a third party service;

determining, by the processing device at a second time, that the first event satisfies the first criterion of the first rule at the second time;

determining whether the first command was permissible to the first security context at the second time; and responsive to determining that the first command was permissible to the first security context at the second time, performing the following comprising:

determining, by the processing device, that the first action is to be performed by the first network-connected device;

generating the first command for the first network-connected device; and transmitting the first command to the first network-connected device.

2. The method of claim 1, further comprising:

receiving an additional notification of a second event from the third party service;

determining that the second event satisfies a second criterion of the first rule; and generating the first command responsive to determining that the first event satisfies the first criterion and that the second event satisfies the second criterion.

3. The method of claim 1, wherein the first network-connected device comprises a first embedded system and the second network-connected device comprises a second embedded system.

4. The method of claim 1, further comprising:

generating a second command for a service running on a server computing device responsive to determining that the first event satisfies the first criterion; and transmitting the second command to the service on the server computing device.

5. The method of claim 1, further comprising:

transmitting an additional notification to a user of the first user account responsive to determining that the first event satisfies the first criterion, wherein the additional notification comprises at least one of a text message or an electronic mail message.

6. The method of claim 1, further comprising:
generating a log, wherein the log comprises entries for the generating of the first command and for the transmitting of the first command, and wherein the entries identify the first security context of the first user account.

7. The method of claim 1, wherein the rules engine is a multitenant rules engine, the method further comprising:
receiving an additional notification of a second event on at least one of a third network-connected device or a first service;
determining that the second event satisfies a second criterion of a second rule associated with a second user account associated with a second security context; and
generating a second command for at least one of a fourth network-connected device or a second service responsive to determining that the second event satisfies the second criterion of the second rule, wherein the first rule is inaccessible to the second user account and inapplicable to network-connected devices associated with the second user account, and wherein the second rule is inaccessible to the first user account and inapplicable to network-connected devices associated with the first user account.

8. The method of claim 1, further comprising:
receiving, from the first user account, a request to generate the first rule;
providing a user interface for rule generation, wherein the user interface provides information on network-connected devices associated with the first user account, information on events associated with the network-connected devices, and information on actions associated with the network-connected devices;
receiving, via the user interface, selection of the first event to be used in the first criterion for the first rule;
receiving, via the user interface, selection of the first network-connected device and of the action to be used as an output for the first rule; and
generating the first rule.

9. The method of claim 8, wherein the first rule is generated without a user writing any code for the first rule.

10. The method of claim 1, further comprising:
determining that a second event has failed to occur on at least one of the first network-connected device or a first service;
determining that failure of the second event to occur satisfies a second criterion of a second rule; and
generating a second command for at least one of the second network-connected device or a second service responsive to determining that the second criterion is satisfied.

11. The method of claim 1, further comprising:
determining that the first action performed on the first network-connected device causes a second criterion of a second rule to be satisfied;
generating a second command for the second network-connected device responsive to determining that the second criterion is satisfied;
detecting that generation of the second command introduces a rule execution loop under particular circumstances; and
preventing the rule execution loop from occurring.

12. The method of claim 1, further comprising:
detecting that the first criterion of the first rule is satisfied again;
determining whether a rate limit has been exceeded by the first rule, wherein the rate limit limits the first rule to a set number of implementations per a given time period; and
preventing the first command from being generated again responsive to determining that the rate limit has been exceeded by the first rule.

13. A non-transitory computer readable storage medium having instructions that, when executed by a processing device, cause the processing device to perform operations comprising:
generating, at a first time, a first rule associated with a first user account having a first security context, wherein the first rule also has the first security context, wherein the first rule comprises instructions to generate a first command to cause a first network-connected device to perform a first action responsive to satisfaction of a first criterion, and wherein the first command is permissible to the first security context at the first time;
receiving, by the processing device, a notification of a first event on at least one of the first network-connected device, a second network-connected device or a third party service;
determining, by the processing device at a second time, that the first event satisfies the first criterion of the first rule at the second time;
determining whether the first command was permissible to the first security context at the second time; and
responsive to determining that the first command was permissible to the first security context at the second time, performing the following comprising:
determining, by the processing device, that the first action is to be performed by the first network-connected device;
generating the first command for the first network-connected device; and
transmitting the first command to the first network-connected device.

14. The non-transitory computer readable storage medium of claim 13, the operations further comprising:
receiving an additional notification of a second event from the third party service;
determining that the second event satisfies a second criterion of the first rule; and
generating the first command responsive to determining that the first event satisfies the first criterion and that the second event satisfies the second criterion.

15. The non-transitory computer readable storage medium of claim 13, the operations further comprising:
generating a second command for a service running on a server computing device responsive to determining that the first event satisfies the first criterion; and
transmitting the second command to the service on the server computing device.

16. The non-transitory computer readable storage medium of claim 13, wherein the processing device executes a multitenant rules engine, the operations further comprising:
receiving an additional notification of a second event on at least one of a third network-connected device or a first service;
determining that the second event satisfies a second criterion of a second rule associated with a second user account associated with a second security context; and
generating a second command for at least one of a fourth network-connected device or a second service responsive to determining that the second event satisfies the second criterion of the second rule, wherein the first rule is inaccessible to the second user account and inapplicable to network-connected devices associated with the second user account, and wherein the second rule is inaccessible to the first user account and inapplicable to network-connected devices associated with the first user account.

17. The non-transitory computer readable storage medium of claim 13, the operations further comprising:
receiving a request to generate the first rule from the first user account;
providing a user interface for rule generation, wherein the user interface provides information on network-connected devices associated with the first user account, information on events associated with the network-connected devices, and information on actions associated with the network-connected devices;
receiving, via the user interface, selection of the first event to be used as the first criterion for the first rule;
receiving, via the user interface, selection of the first network-connected device and of the action to be used as an output for the first rule; and
generating the first rule.

18. A system comprising:
a memory to store a first rule and instructions for a rules engine; and
a processing device, coupled to the memory, to execute the instructions for the rules engine, wherein the instructions cause the processing device to:
generate, at a first time, a first rule associated with a first user account having a first security context, wherein the first rule also has the first security context, wherein the first rule comprises instructions to generate a first command to cause a first network-connected device to perform a first action responsive to satisfaction of a first criterion, and wherein the first command is permissible to the first security context at the first time;
identify the first rule responsive to receipt of a notification of a first event on at least one of the first network-connected device, a second network-connected device or a third party service;
determine that the first event satisfies the first criterion of the first rule at a second time;
determine whether the first command was permissible to the first security context at the second time; and
responsive to determining that the first command was permissible to the first security context at the second time, perform the following comprising:
determine a first action to be performed by the first network-connected device;
generate the first command for the first network-connected device; and
transmit the first command to the first network-connected device.

\* \* \* \* \*